United States Patent
Liao (10) Patent No.: US 6,578,455 B2
(45) Date of Patent: Jun. 17, 2003

(54) WOOD LATHE WITH AN OUTPUT SHAFT AND AN OUTPUT SHAFT-DRIVING SOURCE THAT ARE DISPOSED RESPECTIVELY ON TWO ENDS OF A TABLE

(76) Inventor: Juei-Seng Liao, No. 295, Sec. 1, Nanking E. Rd., Taichung City (TW)

( * ) Notice: Subject to any disclaimer, the term of this patent is extended or adjusted under 35 U.S.C. 154(b) by 0 days.

(21) Appl. No.: 10/090,386

(22) Filed: Mar. 4, 2002

(65) Prior Publication Data

US 2003/0094214 A1 May 22, 2003

(30) Foreign Application Priority Data

Nov. 22, 2001 (TW) .......................... 90220198 U (51) Int. Cl.⁷ .................. B27C 7/02; B23B 17/00; F16H 9/16
(52) U.S. Cl. ............... 82/117; 82/142; 142/1; 474/40
(58) Field of Search .................. 82/117, 142, 143; 142/1, 3–5, 17; 144/46, 48.3; 29/27 R, 27 A; 474/37, 39, 40–42

(56) References Cited

U.S. PATENT DOCUMENTS

| | | | | |
|---|---|---|---|---|
| 2,024,460 A | * | 12/1935 | Lewellen et al. | 474/40 |
| 2,096,431 A | * | 10/1937 | Keller | 474/40 |
| 2,517,608 A | * | 8/1950 | Taylor | 29/27 R |
| 3,410,326 A | * | 11/1968 | Paquin | 142/1 |
| 3,418,863 A | * | 12/1968 | Landau | 474/40 |
| 3,705,517 A | * | 12/1972 | Yamanaka et al. | 474/40 |
| 5,186,088 A | * | 2/1993 | Wixey | 82/142 |

\* cited by examiner

*Primary Examiner*—Steven C. Bishop
(74) *Attorney, Agent, or Firm*—Knobbe, Martens, Olson & Bear, LLP (57) ABSTRACT

A wood lathe includes first and second seats disposed respectively and fixedly on two ends of a table. A first driving device includes a motor disposed on the second seat, an outer tube fixed between the first and second seats, and a rotating inner rod journalled within the tube and connected to the motor by a belt and pulley unit. An output shaft is journalled on the first seat, and is provided with a fixed first clamping element. A second clamping element is disposed adjacent to the second seat so as to clamp a workpiece between the first and second clamping elements. A second driving device is disposed within the first seat, and interconnects the shaft and the rod to transfer rotation of the rod to the shaft, thereby rotating the workpiece.

2 Claims, 13 Drawing Sheets

WOOD LATHE WITH AN OUTPUT SHAFT AND AN OUTPUT SHAFT-DRIVING SOURCE THAT ARE DISPOSED RESPECTIVELY ON TWO ENDS OF A TABLE

CROSS REFERENCE TO RELATED APPLICATION

This application claims priority of Taiwanese Application No. 90220198, filed on Nov. 22, 2001.

BACKGROUND OF THE INVENTION

1. Field of the Invention

This invention relates to a wood lathe, and more particularly to a wood lathe, which includes an output shaft for rotating a workpiece, and an output shaft-driving source, such as a motor, that are disposed respectively on two ends of a table.

2. Description of the Related Art

Figure 1:
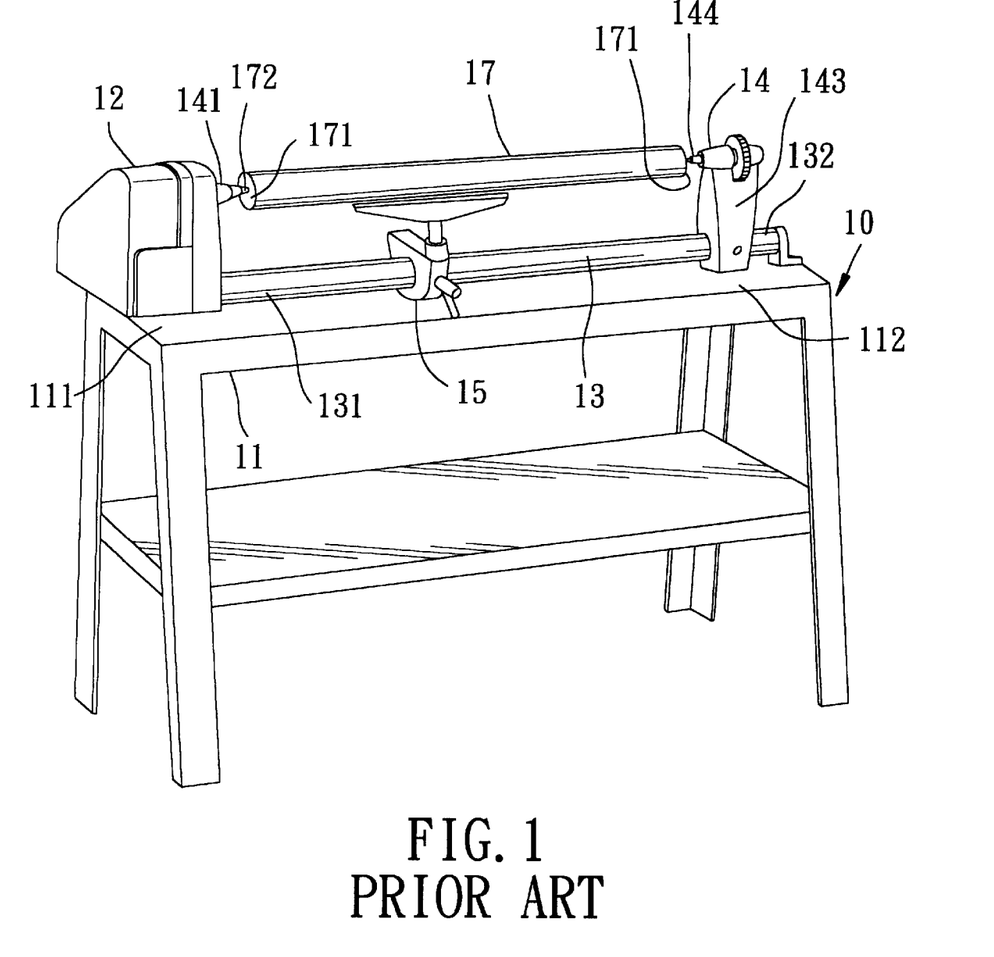
FIG. 1 is a perspective view of a conventional wood lathe.
Figure 2:
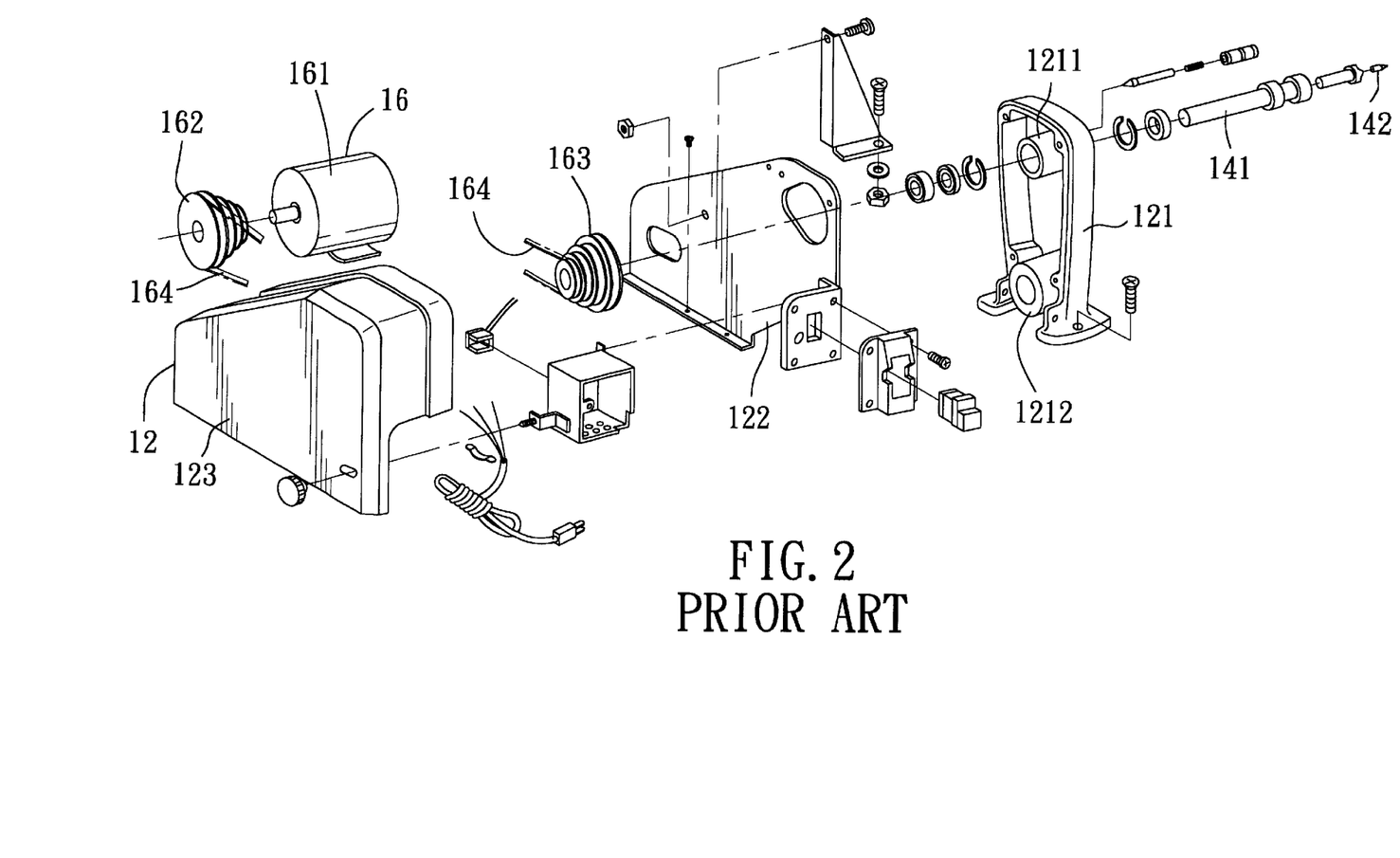
FIG. 2 is a fragmentary exploded perspective view of the conventional wood lathe.

Referring to FIGS. 1 and 2, a conventional wood lathe 10 is shown to include a table 11, a fixed seat 12, a coupling rod 13, a workpiece-holding unit 14, a blade unit 15, and a driving unit 16. The table 11 has a first end 111 and a second end 112. The fixed seat 12 includes a right housing 121, a partition 122, and a left housing 123. The partition 122 is disposed between and is connected removably to the right and left housings 121, 123. The coupling rod 13 is disposed fixedly on the table 11, and has a first end 131 that extends through a bushing 1212 on the right housing 121 of the fixed seat 12, and a second end 132. The workpiece-holding unit 14 includes an output shaft 141 that extends through a bearing 1211 on the right housing 121, a left clamping element 142 that is bolted to the output shaft 141, a sliding member 143 that is sleeved movably and that is locked releaseably on the second end 132 of the coupling rod 13, and a right clamping element 144 that is mounted rotatably on the sliding member 143. The left and right clamping elements 141, 144 press respectively against two end surfaces 172, 171 of an elongated wood workpiece 17 so as to clamp the workpiece 17 between the left and right clamping elements 141, 144, thereby permitting synchronous rotation of the workpiece 17 and the output shaft 141. The driving device 16 includes a motor 161 that is disposed between the left housing 123 and the partition 122, a stepped driving wheel 162 that is sleeved fixedly on a motor shaft of the motor 161, a stepped driven wheel 163 that is sleeved fixedly on the output shaft 141, and an endless driving belt 164 that is trained on the driving wheel 162 and the driven wheel 163. Because all of the elements 161, 162, 163, 164 are disposed within the fixed seat 12, the latter is bulky in volume, thereby resulting in difficulties during installation, maintenance and repair of the lathe 10.

SUMMARY OF THE INVENTION

The object of this invention is to provide a wood lathe having both an output shaft and an output shaft-driving source, which are disposed respectively on two compact seats that are fixed respectively on two ends of a table, thereby resulting in convenience during installation, maintenance, and repair of the lathe.

According to this invention, a wood lathe includes first and second seats disposed respectively and fixedly on two ends of a table. A first driving device includes a motor disposed on the second seat, an outer tube fixed between the first and second seats, and a rotating inner rod journalled within the tube and connected to the motor by a belt and pulley unit. An output shaft is journalled on the first seat, and is provided with a fixed first clamping element. A second clamping element is disposed adjacent to the second seat so as to clamp a workpiece between the first and second clamping elements. A second driving device is disposed within the first seat, and interconnects the shaft and the rod to transfer rotation of the rod to the shaft, thereby rotating the workpiece. Because the motor and the shaft are disposed respectively on two different seats, i.e. first and second seats, the volume of each of the first and second seats is relatively compact so that the first and second seats and the first and second driving devices are easy to install, maintain, and repair.

BRIEF DESCRIPTION OF THE DRAWINGS

These and other features and advantages of this invention will become apparent in the following detailed description of a preferred embodiment of this invention, with reference to the accompanying drawings, in which.

DETAILED DESCRIPTION OF THE PREFERRED EMBODIMENT

Figure 3:
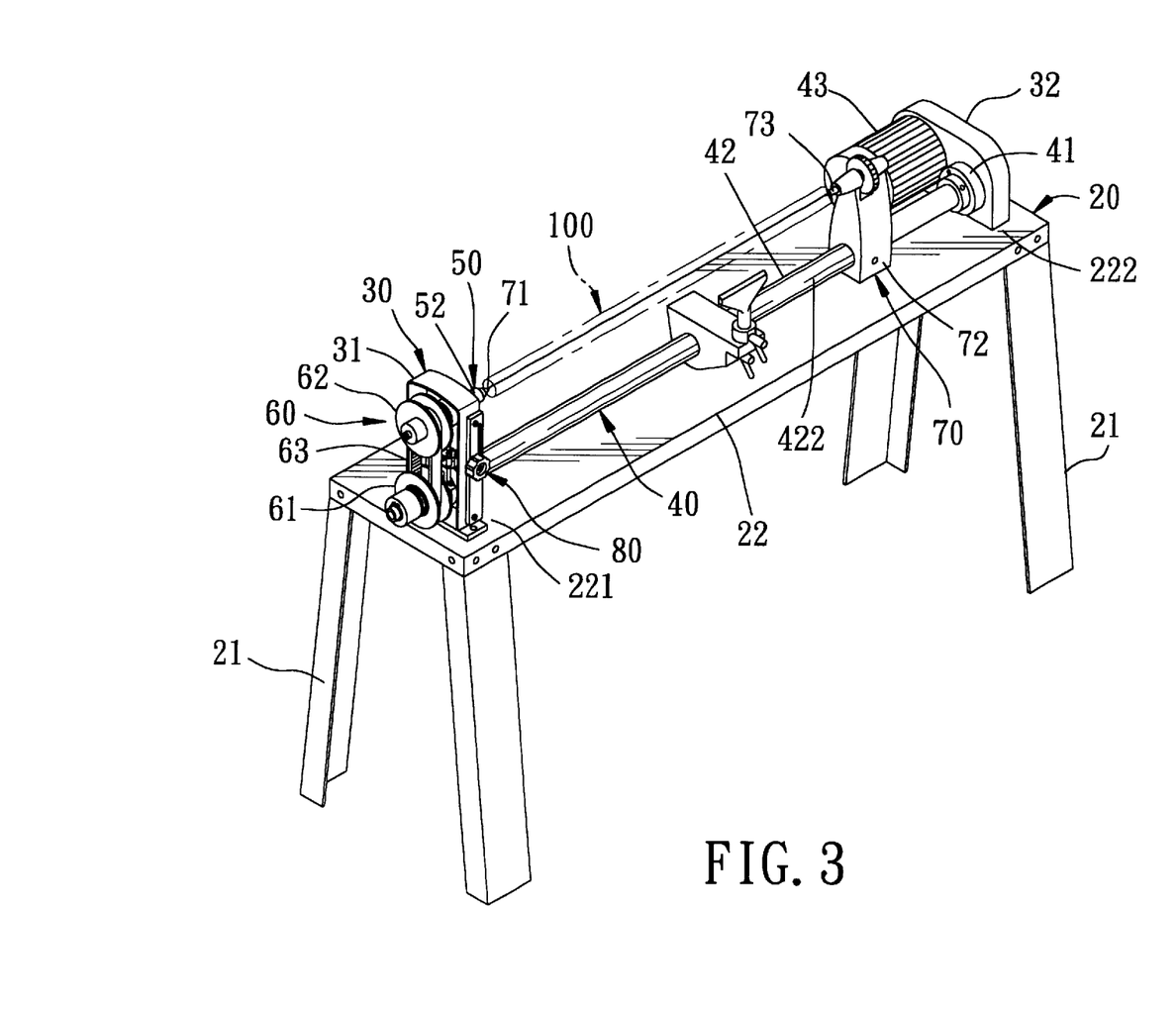
FIG. 3 is an assembled perspective view of the preferred embodiment of a wood lathe according to this invention.

Referring to FIG. 3, the preferred embodiment of a wood lathe according to this invention is shown to include a table 20, a fixed seat unit 30, a first driving device 40, an output shaft 50, and a second driving device 60.

The table 20 has four legs 21 and an elongated horizontal table top 22.

The fixed seat unit 30 includes a first seat 31 and a second seat 32 that are fixed respectively on first and second ends 221, 222 of the table top 22.

Figure 7:
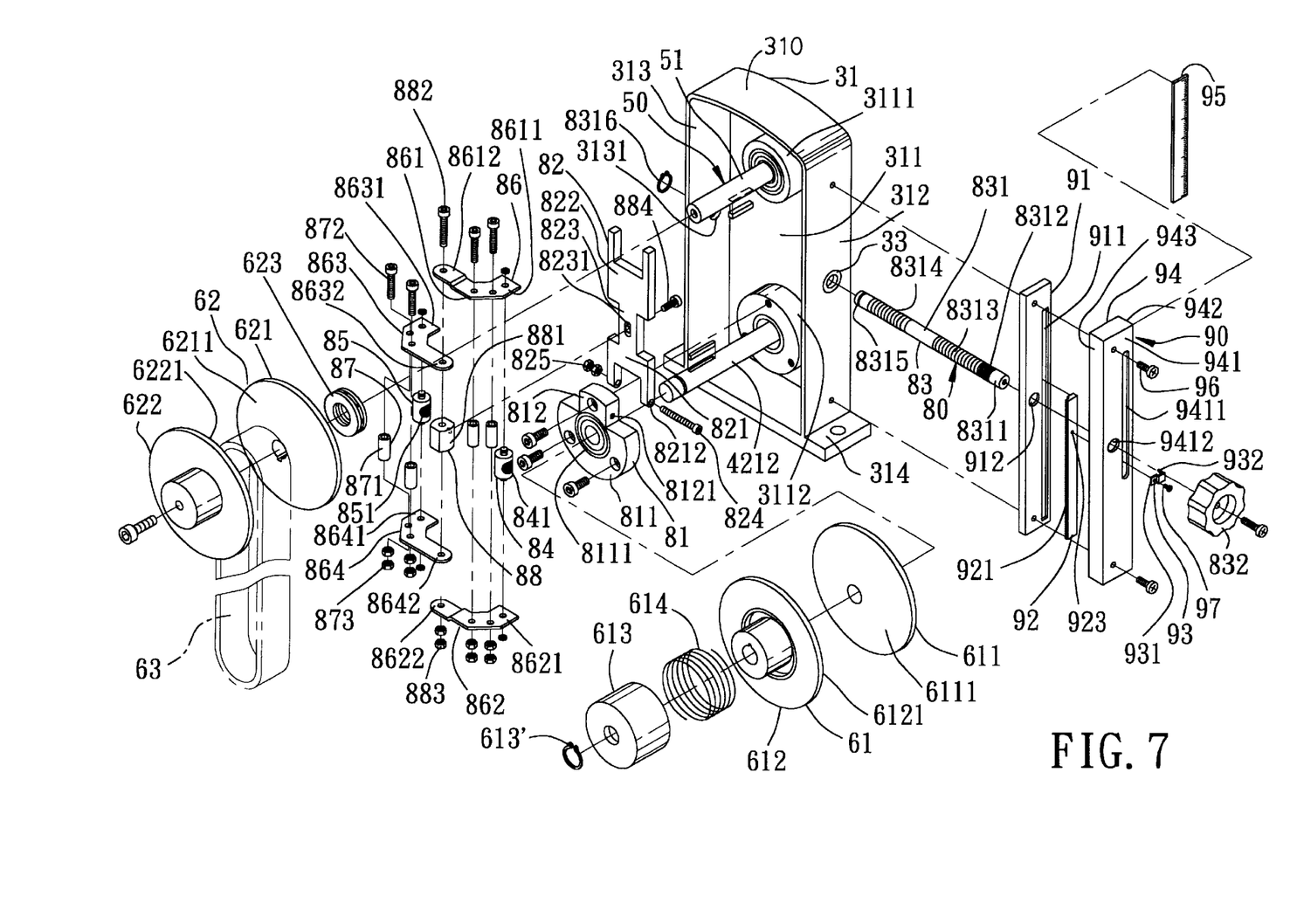
FIG. 7 is an exploded perspective view illustrating the second driving device, the speed-adjusting unit, and an indicator unit of the preferred embodiment.

Referring to FIG. 7, the first seat 31 has a hollow housing, which includes a top wall 310, a right side wall 311, a front side wall 312, a rear side wall 313, and a bottom wall 314 that is bolted onto the table top 22. The right side wall 311 is provided with a top bearing unit 3111 and a bottom bearing unit 3112. A bushing 33 extends through and is fixed on the front side wall 312. The rear side wall 313 is formed with a hole 3131 that is aligned with the bushing 33.

Figure 4:
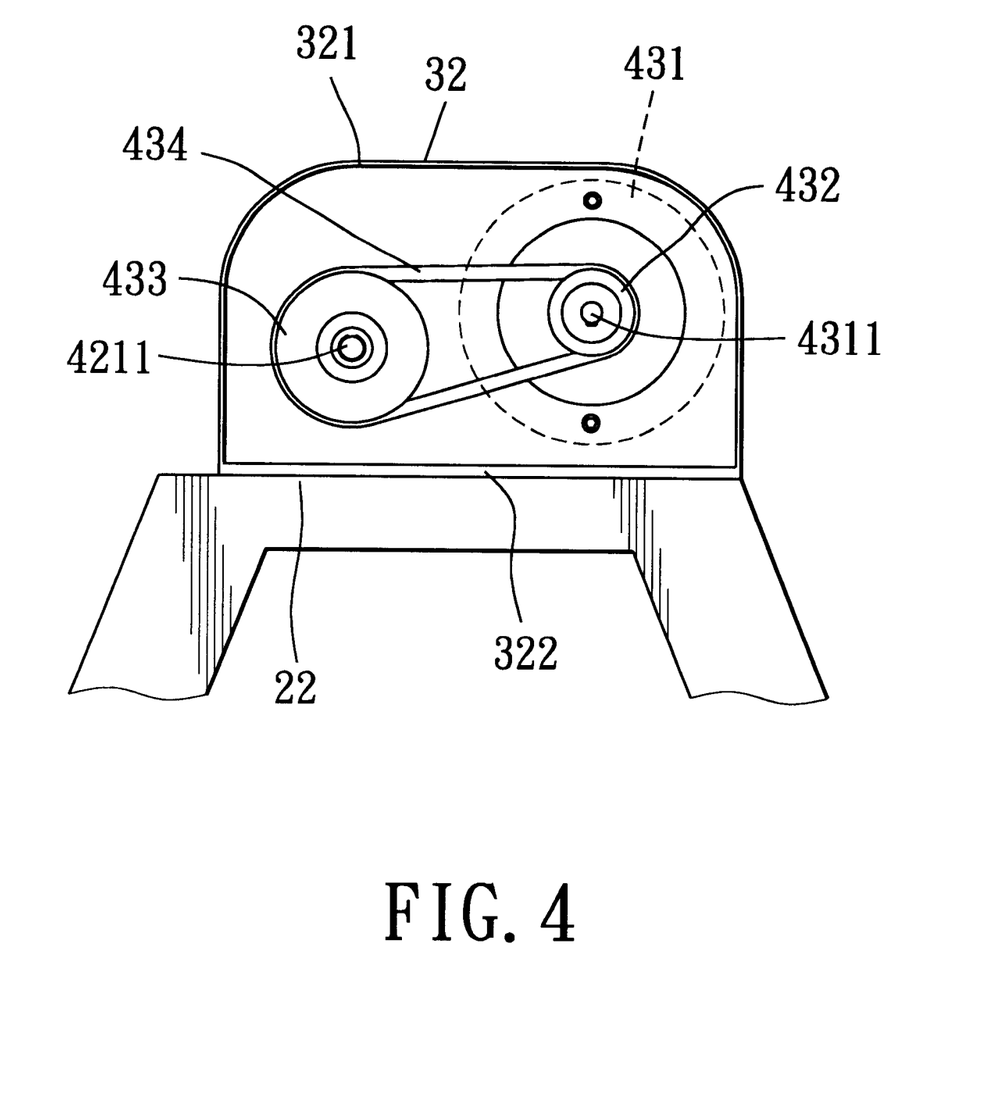
FIG. 4 is a schematic fragmentary side view of the preferred embodiment, illustrating how a belt and pulley unit is disposed between a motor shaft and a rotating inner rod.
Figure 6:
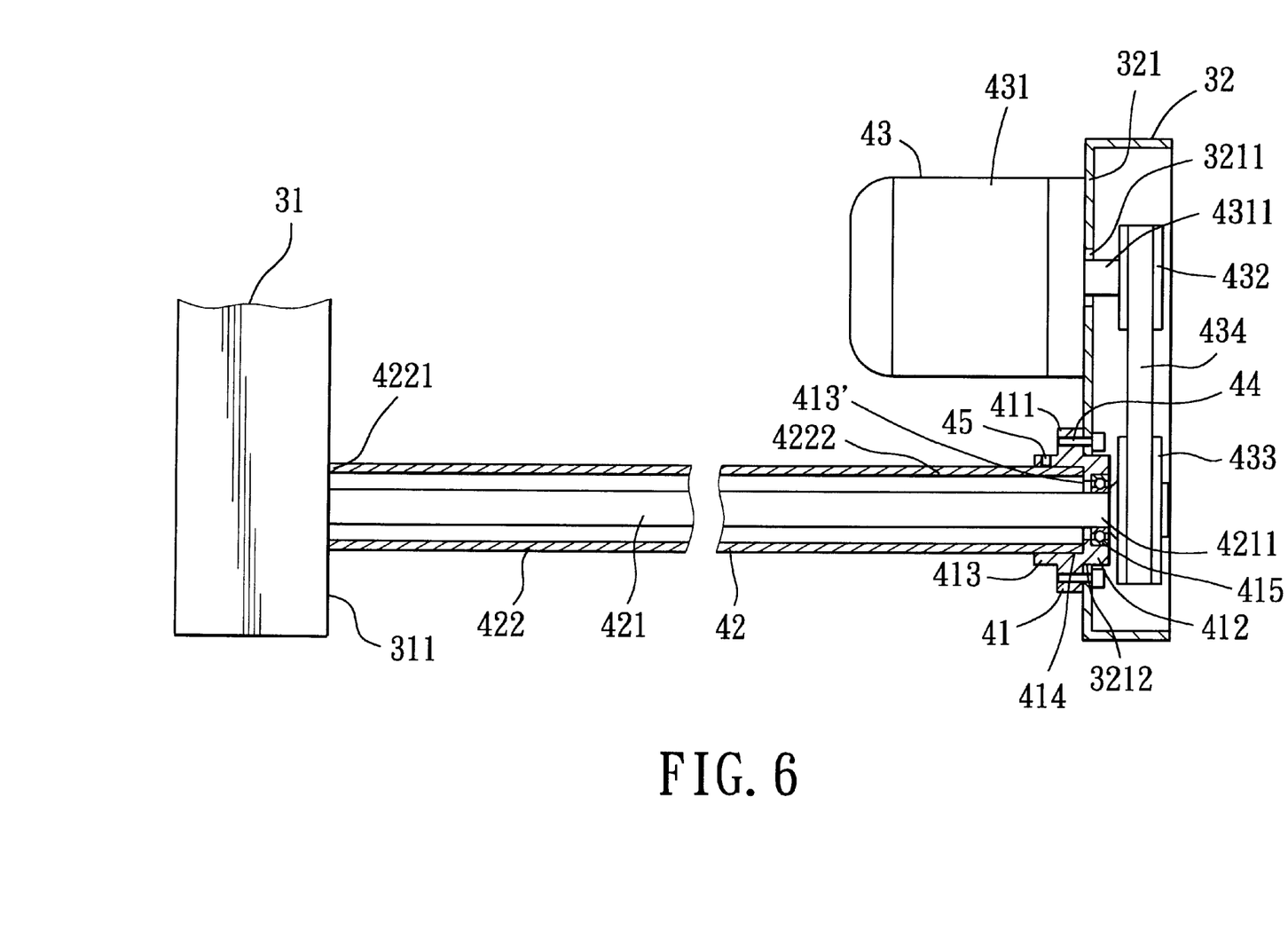
FIG. 6 is a partly sectional fragmentary top view of the preferred embodiment, showing a first driving device.

Referring to FIGS. 4 and 6, the second seat 32 also has a hollow housing, which includes a left side wall 321 and a bottom wall 322 that is bolted onto the table top 22. The left side wall 321 is formed with a hole 3212 that is aligned with the bottom bearing unit 3112 (see FIG. 7) of the first seat 31.

Referring to FIGS. 3, 4, 6, and 8, the first driving device 40 includes a bearing unit 41 that is disposed within the hole 3212 in the second seat 32, a constant-speed rotating unit 42, and a driving source assembly 43.

The bearing unit 41 includes a tubular body, which has an outward flange 411 that is fixed to the left side wall 321 of the second seat 32 by bolts 44, a right end 412 that is inserted into the hole 3212 in the second seat 32, a left end 413, an inward flange 413', and a central hole 414. A bearing 415 is disposed within the right end 412.

The constant-speed rotating unit 42 includes a rotating inner rod 421 that is journalled between the first and second seats 31, 32, and a fixed outer tube 422 that is disposed around the rotating inner rod 421 and that is fixed between the first and second seats 31, 32. The rotating inner rod 421 has a first end 4212 that extends through and that projects outwardly from the bottom bearing unit 3112 of the first seat 31, and a second end 4211 that extends through and that projects outwardly from the bearing unit 41 disposed within the second seat 32. The outer tube 422 has a first end 4221 that extends into and that is fixed to the first seat 31, and a second end 4222 that extends into and that is fixed to the bearing unit 41 by a lock bolt 45.

The driving source assembly 43 includes a motor 431, a first driving pulley 432, a first driven pulley 433, and a first V-belt 434. The motor 431 is disposed on the left side wall 321 of the second seat 32, and is provided with a motor shaft 4311 that extends from a hole 3211 in the left side wall 321. The first driving pulley 432 is sleeved fixedly on the motor shaft 4311. The first driven pulley 433 is sleeved fixedly on the second end 4211 of the rotating inner rod 421. The first V-belt 434 is trained on the first driving and driven pulleys 432, 433 so as to transfer rotation of the motor shaft 4311 to the rotating inner rod 421 in such a manner that the rotating inner rod 421 rotates at a speed slower than that of the motor shaft 4311.

Figure 8:
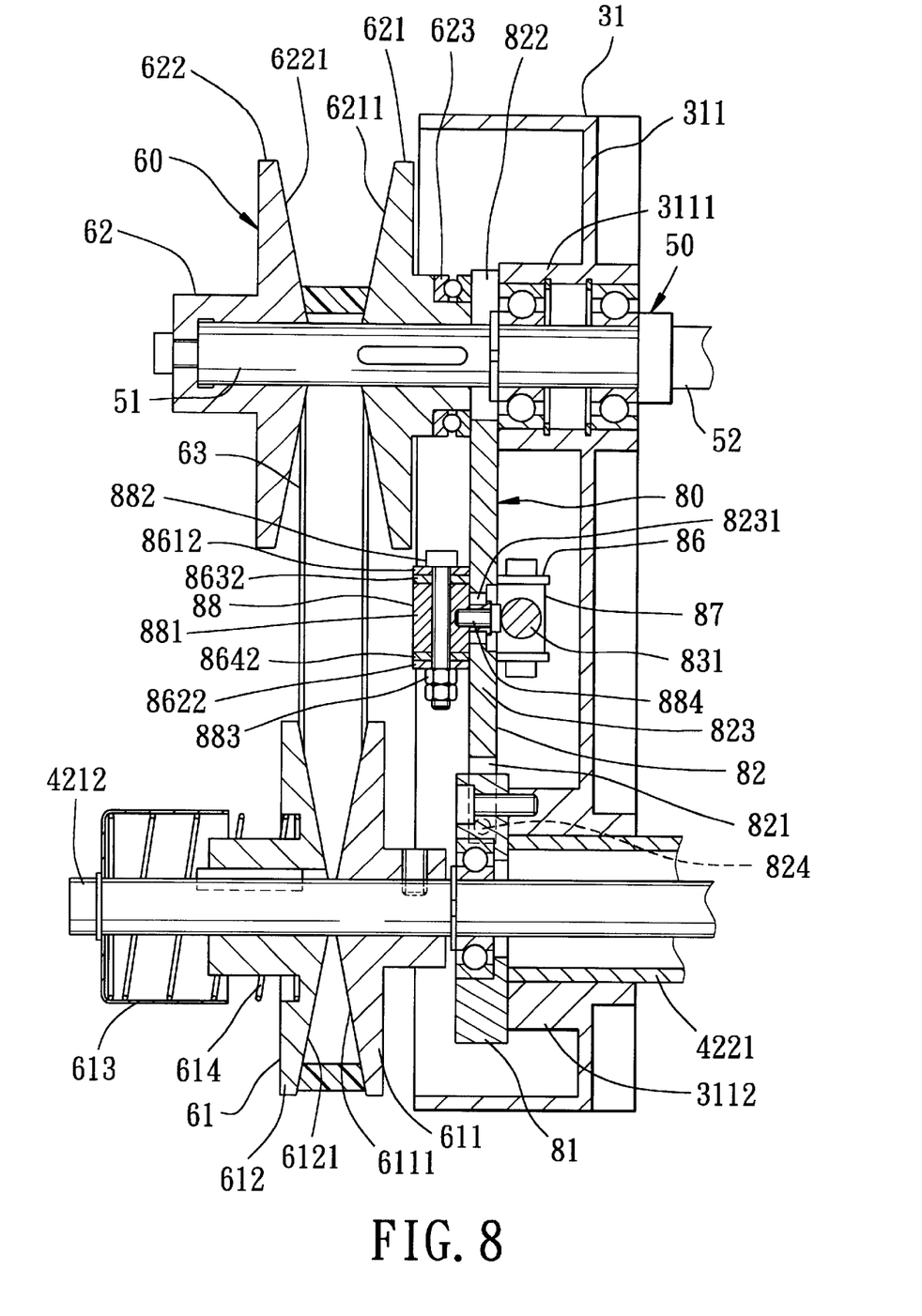
FIG. 8 is a fragmentary sectional view of the preferred embodiment, showing the second driving device when disposed at a first position so that an output shaft can rotate at a maximum speed.

Referring to FIGS. 3, 7, and 8, the output shaft 50 is journalled on the top bearing unit 3111 of the first seat 31, is parallel to the rotating inner rod 421, and has a first end 51 that is disposed over the first end 4212 of the rotating inner rod 421, and a second end 52 that projects outwardly from the first seat 31 and that is disposed between the first and second seats 31, 32.

The second driving device 60 is disposed between the first end 4212 of the rotating inner rod 421 and the first end 51 of the output shaft 50 so as to transfer rotation of the rotating inner rod 421 to the output shaft 50.

The workpiece-holding unit 70 includes a first clamping element 71 that is connected fixedly to the second end 52 of the output shaft 50, a sliding member 72 that is sleeved movably and that is locked releaseably on the outer tube 422, and a second clamping element 73 that is mounted rotatably on the sliding element 72 in a known manner. As such, a wood workpiece 100 can be clamped between the first and second clamping elements 71, 73 in a known manner, thereby permitting synchronous rotation of the workpiece 100 with the output shaft 50.

Figure 5:
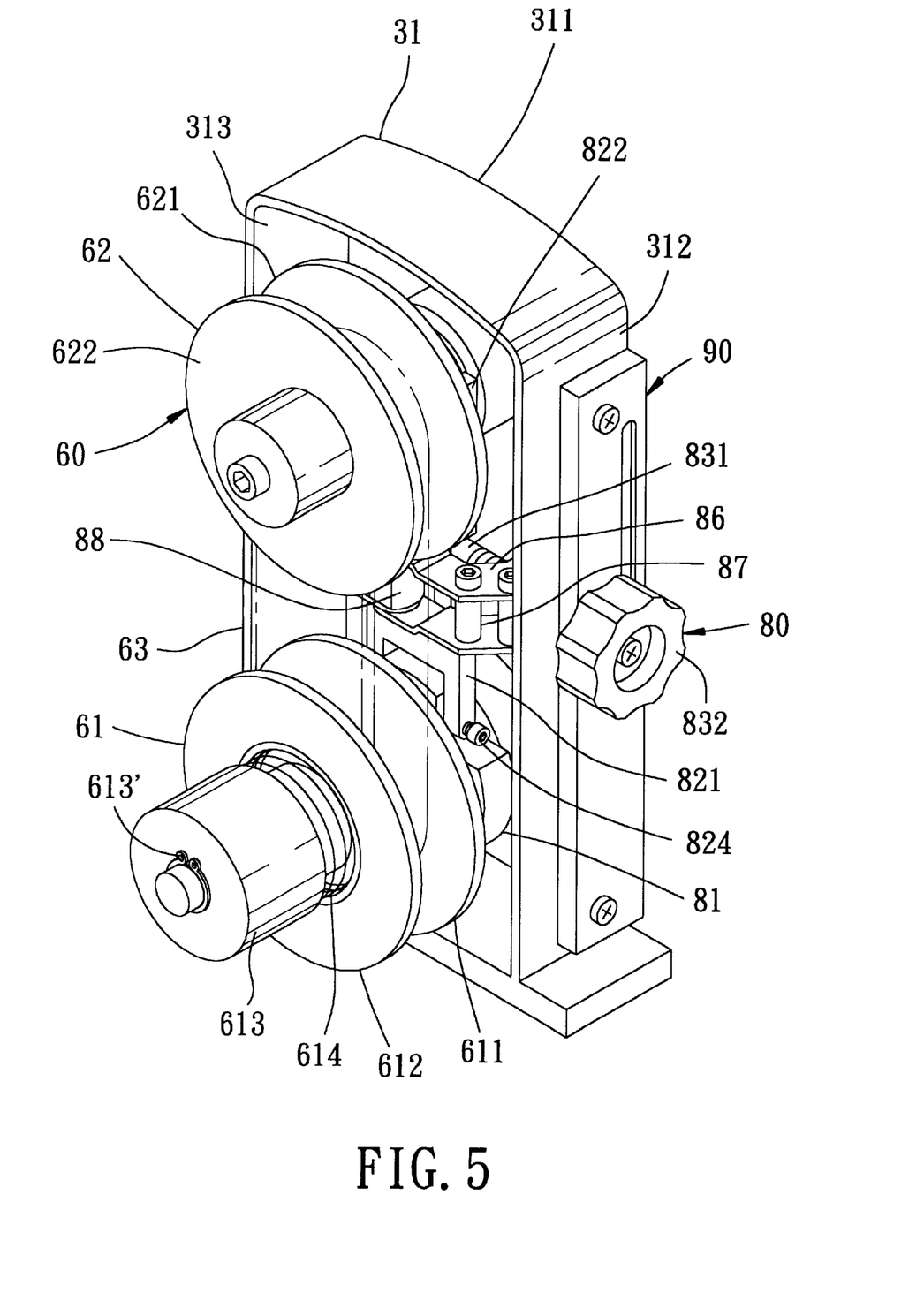
FIG. 5 is an assembled fragmentary perspective view of the preferred embodiment, illustrating how a second driving device and a speed-adjusting unit are disposed on a first seat.

Referring to FIGS. 5 and 7, the second driving device 60 includes a second driving pulley 61 that is disposed around the rotating inner rod 421, a second driven pulley 62 that is disposed around the output shaft 50, and a second V-belt 63 that is trained on the second driving and driven pulleys 61, 62.

The second driving pulley 61 includes a fixed inner half 611 that is sleeved on the first end 4212 of the rotating inner rod 421, a movable outer half 612 that is sleeved movably on the first end 4212 in such a manner that the fixed inner half 611 is located between the movable outer half 612 and the first seat 31, an annular positioning cap 613 that is sleeved and retained on the first end 4212 by a C-shaped retaining ring 613', and a coiled compression spring 614 that is disposed between the cap 613 and the movable outer half 612 so as to press the cap 613 against the C-shaped retaining ring 613' and so as to bias the movable outer half 612 toward the fixed inner half 611. The fixed inner half 611 and the movable outer half 612 are formed respectively with two inclined belt-engaging surfaces 6111, 6121 that define a trapezoidal-cross-sectioned groove for engaging the second V-belt 63. The second driven pulley 62 includes a movable inner half 621 that is sleeved movably on the first end 51 of the output shaft 50, a fixed outer half 622 that is sleeved fixedly on the first end 51 in such a manner that the movable inner half 621 is located between the fixed outer half 622 and the first seat 31, and a thrust bearing 623 that is disposed around a right end of the movable inner half 621. The movable inner half 621 and the fixed outer half 622 are also formed respectively with two inclined belt-engaging surfaces 6211, 6221 that define a trapezoidal-cross-sectioned groove for engaging the second V-belt 63.

A stepless speed-adjusting unit 80 is connected to the second driving device 60, and includes a fixed member 81, a push member 82, a horizontal adjustment rod assembly 83, a first driving element 84, a second driving element 85, a link assembly 86, a spacer assembly 87, and a pusher-connecting assembly 88.

The fixed member 81 is bolted onto the right side wall 311 of the first seat 31, and has a semicircular lower portion 811, and a neck 812 that extends integrally and upwardly from a middle portion of a top surface of the lower portion 811. The lower portion 811 is provided with a bearing unit 8111, through which the first end 4212 of the rotating inner rod 421 extends. The neck 812 is formed with a hole 8121.

The push member 82 is unitary, and has an inverted U-shaped lower pivot portion 821, a U-shaped upper pushing portion 822, and a connecting portion 823 that interconnects the pivot portion 821 and the upper pushing portion 822. A pivot bolt 824 extends through two holes 8212 in the pivot portion 821 and the holes 8121 in the neck 812 of the fixed member 81 to engage two adjoining nuts 825 so as to permit rotation of the push member 82 about the pivot bolt 824.

The adjustment rod assembly 83 includes a rod body 831, and a rotary knob 832 that is bolted to an end of the rod body 831. The rod body 831 has a knob-engaging end 8311, a pinion portion 8312, a left-hand screw portion 8313, a right-hand screw portion 8314, and a slotted end 8314. A C-shaped retaining ring 8316 is received within an annular slot in the end 8314 for preventing movement of the rod body 831 relative to the first seat 31.

The first and second driving elements 84, 85 engage respectively and threadably the left-hand and right-hand screw portions 8313, 8314 of the adjustment rod assembly 83.

The link assembly 86 includes a first upper link 861 that is connected pivotally to a top end of the first driving element 84 at a rod-coupling end 8611, a first lower link 862 that is connected pivotally to a bottom end of the first driving element 84 at a rod-coupling end 8621, a second upper link 863 that is connected pivotally to a top end of the second driving element 85 at a rod-coupling end 8631, and a second lower link 864 that is connected pivotally to a bottom end of the second driving element 85 at a rod-coupling end 8641. Each of the first upper link 861, the first lower link 862, the second upper link 863, and the second lower link 864 has a link-coupling end 8612, 8622, 8632, 8642. The link-coupling ends 8612, 8632 of the first and second upper links 861, 863 are connected pivotally to each other. The link-coupling ends 8622, 8642 of the first and second lower links 862, 864 are connected pivotally to each other.

The spacer assembly 87 includes four spacer tubes 871, four bolts 872, and four adjacent pairs of nuts 873. Two of the spacer tubes 871 are disposed between the first upper and lower links 861, 862, while another two of the spacer tubes 871 are disposed between the second upper and lower links 863, 864 so that the first and second upper links 861, 863 are spaced apart from the first and second lower links 862, 864 at a predetermined distance. The bolts 872 extend through four holes in the first and second upper links 861,863, the spacer tubes 871, and four holes in the first and second lower links 862, 864 to engage the nuts 873, thereby retaining the spacer tubes 871 on the first and second upper links 861, 863 and the first and second lower links 862, 864.

The pusher-connecting assembly 88 includes a connecting tube 881, a bolt 882, two adjoining nuts 883, and a bolt 884. The connecting tube 881 is disposed between the second upper and lower links 863, 864. The bolt 882 extends through two holes in the first and second upper links 861, 863, the connecting tube 881, and two holes in the first and second lower links 862, 864 to engage two adjoining nuts 883. The bolt 884 extends through a hole 8231 in the push member 82 to engage a threaded hole in the connecting tube 881 so as to swing the push member 82 when the connecting tube 881 moves relative to the first seat 31.

The indicator unit 90 includes a vertical mounting strip 91, a rack 92, an indicator 93, a front cover 94, and a scale 95.

Figure 14:
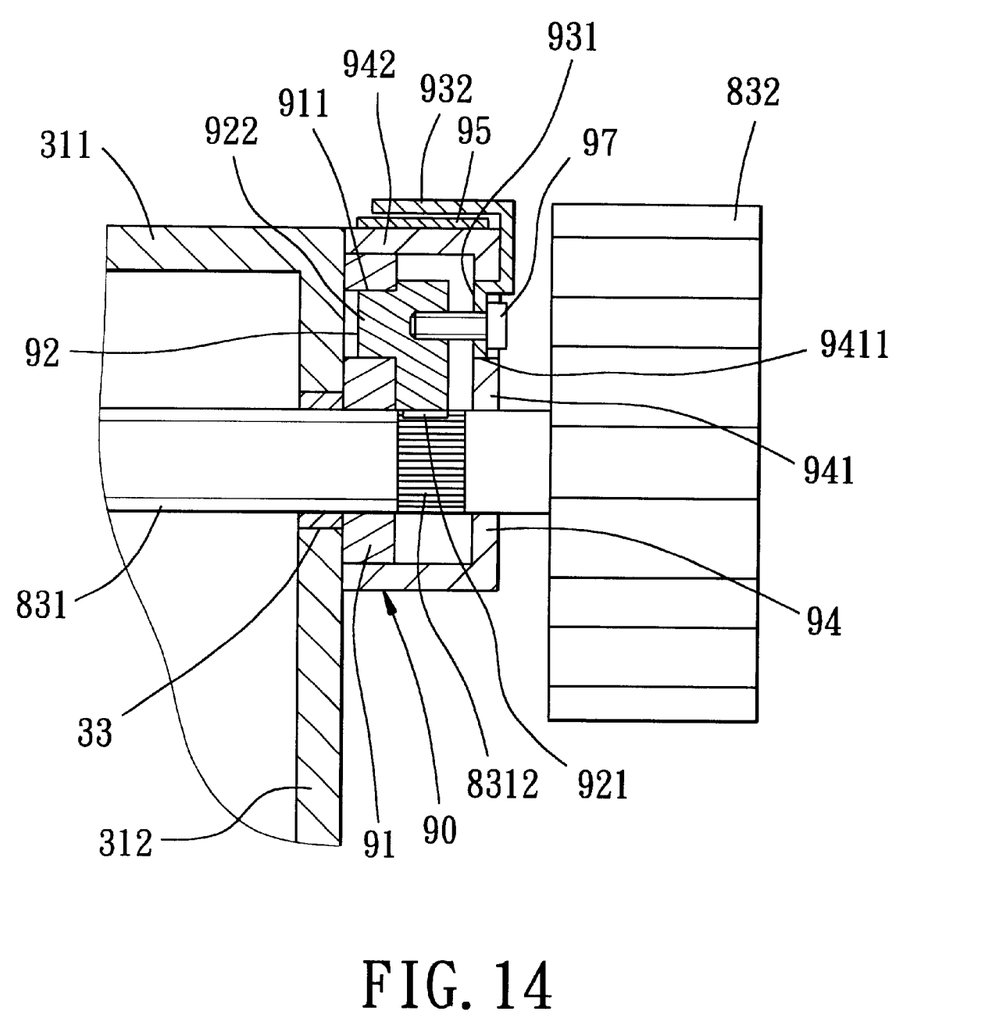
FIG. 14 is a partly sectional fragmentary side view of the preferred embodiment illustrating how the indicator unit is mounted on the first seat.

Referring to FIGS. 7 and 14, the mounting strip 91 and the front cover 94 are connected fixedly to the front side wall 312 of the first seat 31 by two bolts 96, and are formed respectively with two holes 912, 9412 for extension of the rod body 831. The mounting strip 91 is formed with a vertical slide slot 911. The rack 92 is unitary, and has a toothed portion 921 that meshes with the pinion portion 8312 of the rod body 831 of the adjustment rod assembly 83, and a sliding element 922 that is received slidably within the slide slot 911 in the mounting strip 91. As such, when the adjustment rod assembly 83 rotates, the rack 92 moves along the slide slot 911.

The front cover 94 has a front side wall 941 with a vertical slide slot 9411, a right side wall 942, and a left side wall 943.

The indicator 93 is unitary, and has a sliding body 931 that is connected fixedly to the rack 92 by a bolt 97 and that is received slidably within the slide slot 9411 in the front cover 94, and a pointer 932 that projects outwardly from the vertical slide slot 9411 and that is bent to abut against the right side wall 942 of the front cover 94.

The scale 95 is fixed to the right side wall 942 of the front cover 95. The pointer 932 is directed to the scale 95.

Because the rack 92 meshes with the pinion portion 8312 of the adjustment rod assembly 83, when the rotary knob 832 is rotated, the pointer 932 moves vertically relative to the scale 95.

Figure 9:
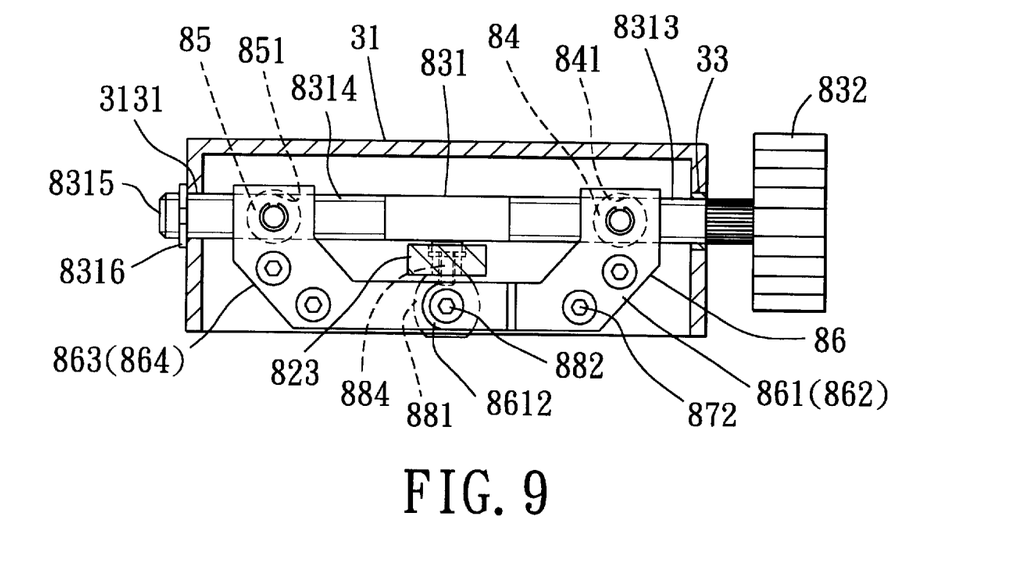
FIG. 9 is a fragmentary sectional top view of the preferred embodiment, illustrating how the speed-adjusting unit is operated so that the second driving device is disposed at the first position.

Referring to FIGS. 8 and 9, the second driving device 60 is disposed at a first position, where the push member 82 is vertical, where the movable outer half 612 of the second driving pulley 61 is disposed at its rightmost position, and where the movable inner half 621 of the second driven pulley 62 is disposed at its rightmost position. As such, the second V-belt 63 engages a radial outer end of the second driving pulley 61 and a radial inner end of the second driven pulley 62 so that the driven pulley 62 and the output shaft 50 can rotate at a maximum speed.

Figure 10:
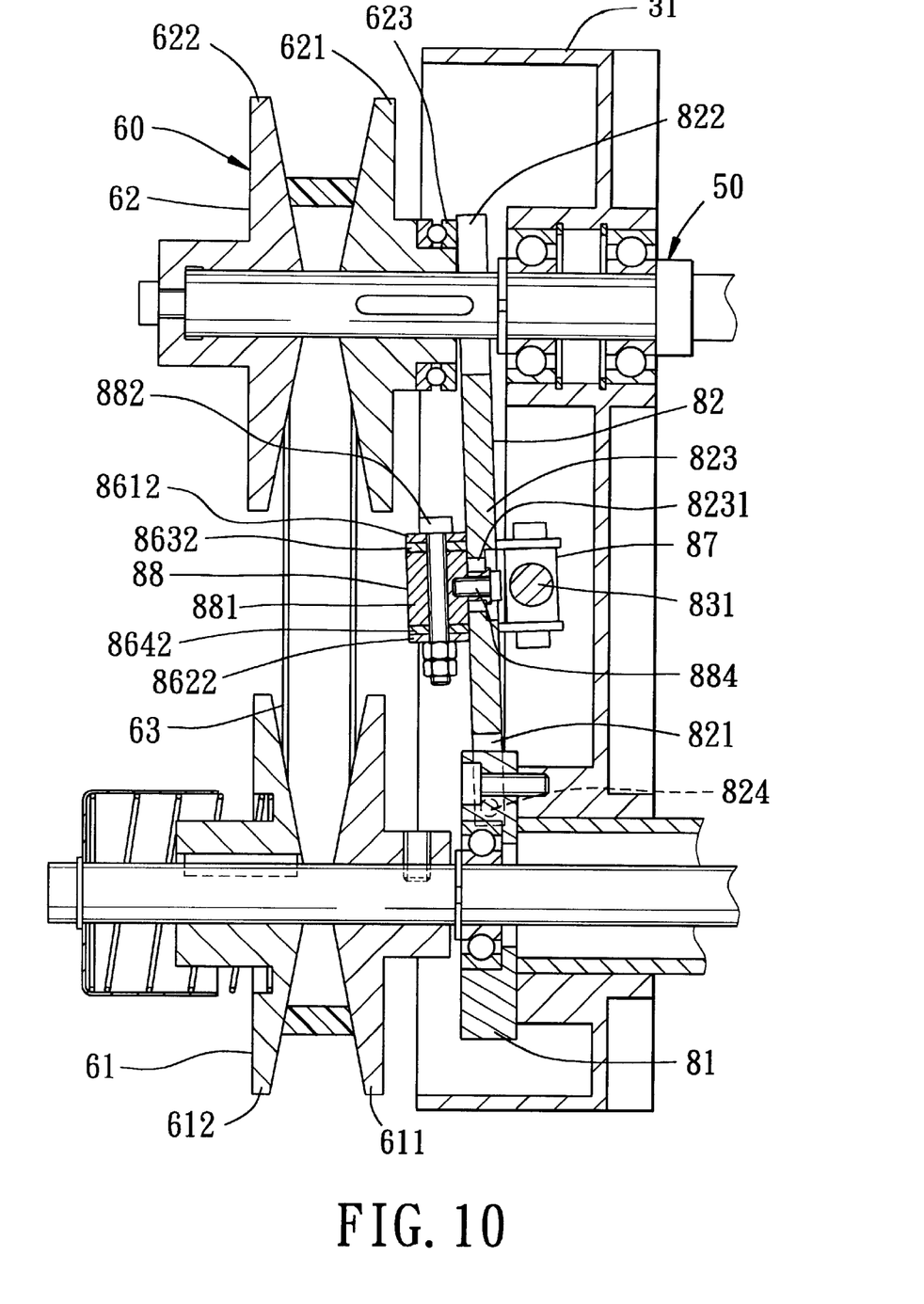
FIG. 10 is a fragmentary sectional view of the preferred embodiment, showing the second driving device when disposed at a second position so as to slow down the rotational speed of the output shaft.
Figure 11:
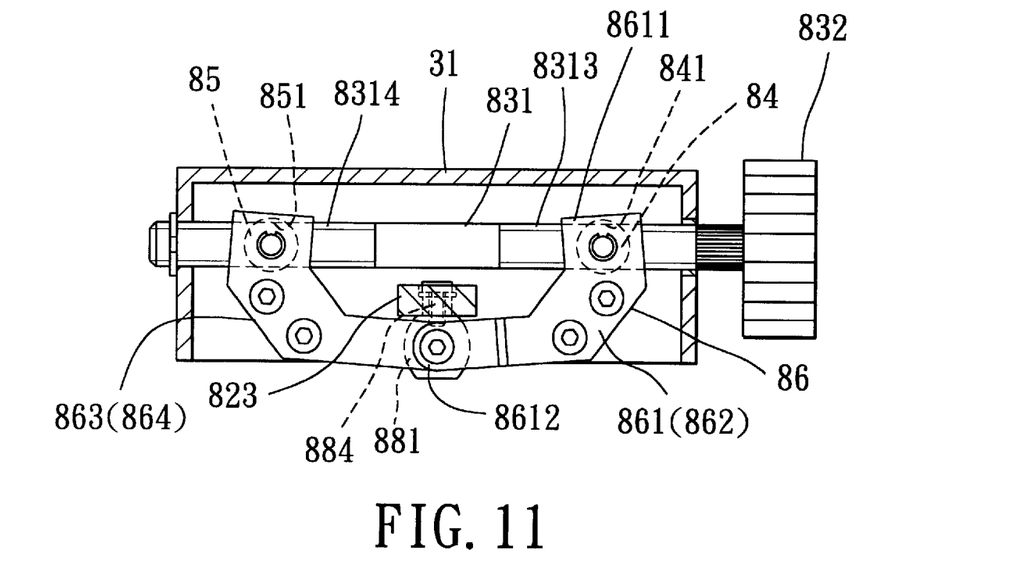
FIG. 11 is a fragmentary sectional top view of the preferred embodiment, illustrating how the speed-adjusting unit is operated so that the second driving device is disposed at the second position, thereby rotating the output shaft and the rotating inner rod at the same speed.

Referring to FIGS. 7, 10, and 11, when it is desired to slow down the rotational speed of the output shaft 50, the rotary knob 832 is rotated in a predetermined direction so as to move the first and second driving elements 84, 85 toward each other from the position shown in FIG. 9 to that shown in FIG. 11, where the first upper and lower links 861, 862 rotate counterclockwise about the bolt 882 and where the second upper and lower links 863, 864 rotate clockwise about the bolt 882 so as to move the connecting tube 881 and the bolt 884 to the left, thereby rotating the push member 82 counterclockwise about the pivot bolt 824. The upper pushing portion 882 of the push member 82 moves the movable inner half 621 of the second driven pulley 62 to the left from the position shown in FIG. 8 to that shown in FIG. 10, where the second V-belt 63 moves radially and outwardly on the second driven pulley 62 to a middle position so as to move the movable outer half 61 to the left against the biasing action of the spring 614, thereby disposing the second driving device 60 at a second position so as to rotate the second driven pulley 62 and the output shaft 50 at the same speed as that of the second driving pulley 61.

Figure 12:
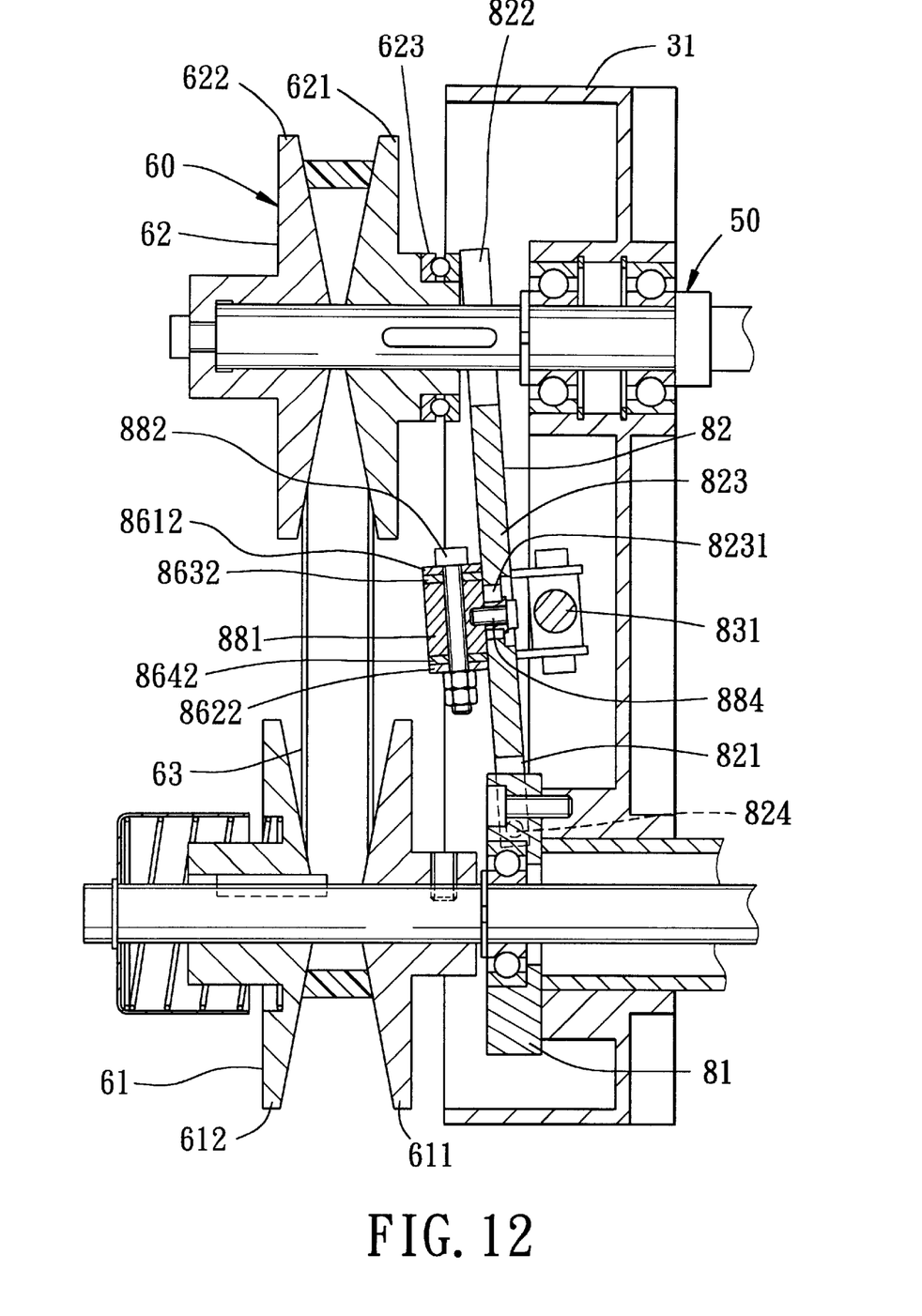
FIG. 12 is a fragmentary sectional view of the preferred embodiment, showing the second driving device when disposed at a third position so as to further slow down the rotational speed of the output shaft, thereby rotating the output shaft at a minimum speed.
Figure 13:
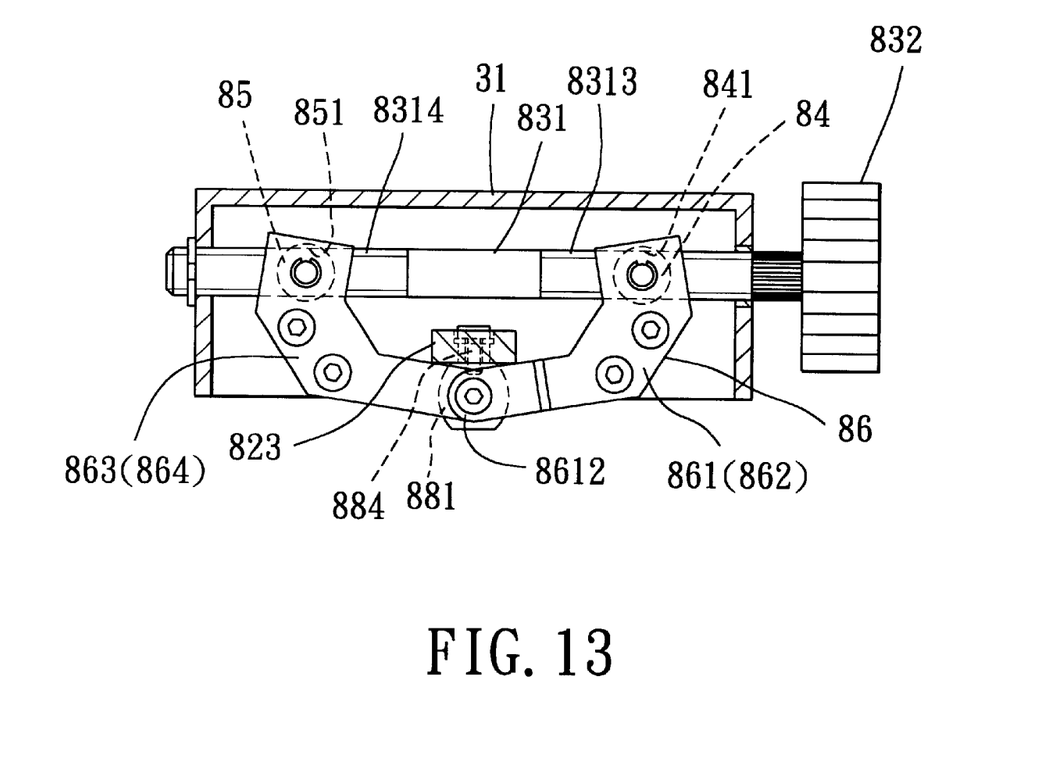
FIG. 13 is a fragmentary sectional top view of the preferred embodiment, illustrating how the speed-adjusting unit is operated so that the second driving device is disposed at the third position.

Referring to FIGS. 12 and 13, when the rotary knob 832 is further rotated in the predetermined direction, the upper pushing portion 822 of the push member 82 can move the movable inner half 621 to its leftmost position, where the second V-belt 63 engages a radial outer end of the second driven pulley 62 so as to move the movable outer half 612 of the second driving pulley 61 to its leftmost position. As such, the second V-belt 63 engages a radial inner end of the second driving pulley 61, thereby disposing the second driving device 60 at a third position so as to rotate the second driven pulley 62 and the output shaft 50 at a minimum speed.

The second driving device 60 can be moved from the position shown in FIG. 12 to that shown in FIGS. 8 or 10 by rotating the rotary knob 832 in a direction that is opposite to the predetermined direction.

With this invention thus explained, it is apparent that numerous modifications and variations can be made without departing from the scope and spirit of this invention. It is therefore intended that this invention be limited only as indicated by the appended claims.

I claim:

1. A wood lathe comprising:

an elongated table having a first end and a second end;

a fixed seat unit including a first seat and a second seat that are fixed respectively on said first and second ends of said table;

a first driving device including
   a rotating inner rod journalled between said first and second seats and having a first end that is disposed adjacent to and that projects outwardly from said first seat, and a second end that is disposed adjacent to and that projects outwardly from said second seat,
   a fixed outer tube disposed around said rotating inner rod and fixed between said first and second seats,
   a motor disposed on said second seat and having a motor shaft that is provided with a first fixed driving pulley,
   a first driven pulley sleeved fixedly on said second end of said rotating inner rod, and
   a first V-belt trained on said first driving and driven pulleys so as to transfer rotation of said motor shaft to said rotating inner rod in such a manner that said rotating inner rod rotates at a speed slower than that of said motor shaft;

an output shaft journalled on said first seat and parallel to said rotating inner rod, said output shaft having a first end that is disposed over said first end of said rotating inner rod, and a second end that projects outwardly from said first seat and that is disposed between said first and second seats;

a second driving device for interconnecting said first ends of said rotating inner rod and said output shaft so as to transfer rotation of said rotating inner rod to said output shaft;

a workpiece-holding unit including:
   a first clamping element connected fixedly to said second end of said output shaft,
   a sliding member sleeved movably on said outer tube, and
   a second clamping element mounted rotatably on said sliding member so as to be adapted to clamp a workpiece between said first and second clamping elements, thereby permitting rotation of the workpiece when said output shaft rotates; and a speed-adjusting unit, said second driving device including a second driving pulley disposed around said first end of said rotating inner rod, a second driven pulley disposed around said first end of said output shaft, and a second V-belt trained on said second driving and driven pulleys, said second driving pulley including a movable outer half that is sleeved movably on said rotating inner rod, a fixed inner half that is sleeved fixedly on said rotating inner rod and that is located between said movable outer half and said first seat, and a spring for biasing said movable outer half toward said fixed inner half, said second driven pulley including a fixed outer half that is sleeved fixedly on said output shaft, and a movable inner half that is sleeved movably on said out put shaft and that is located between said fixed outer half and said first seat, said speed-adjusting unit including:
   a fixed member disposed fixedly on said first seat,
   a push member disposed pivotally on said fixed member,
   a horizontal adjustment rod assembly journalled on said first seat and having a left-hand screw portion and a right-hand screw portion,
   a first driving element engaging threadably said left-hand screw portion of said adjustment rod assembly, and
   a second driving element engaging threadably said right-hand screw portion of said adjustment rod assembly such that said first and second driving elements move toward each other when said adjustment rod assembly rotates in a direction so as to rotate said push member in a direction, thereby moving said movable inner half of said second driven pulley toward said fixed outer half of said second driven pulley, said first and second driving elements moving away from each other when said adjustment rod assembly rotates in the opposite direction so as to rotate said push member in the opposite direction, thereby moving said movable inner half of said second driven pulley away from said fixed outer half of said second driven pulley, movement of said movable inner half of said second driven pulley relative to said fixed outer half of said second driven pulley resulting in change in position of said second V-belt relative to said second driving and driven pulleys, thereby varying rotational speed ratio of said output shaft to said rotating inner rod.

2. The wood lathe as claimed in claim 1, wherein said adjustment rod assembly is formed with a fixed pinion portion, said wood lathe further having an indicator unit that includes:

a rack connected vertically and movably to said first seat and meshing with said pinion portion of said adjustment rod assembly so as to move vertically relative to said first seat when said adjustment rod assembly rotates;

a scale fixed relative to said first seat; and an indicator connected fixedly to said rack so as to move vertically relative to said scale when said adjustment rod assembly rotates.

* * * * *